(12) United States Patent
Bates et al.

(10) Patent No.: US 6,321,910 B1
(45) Date of Patent: Nov. 27, 2001

(54) CONTAINER FOR STACKED SHEETS

(75) Inventors: Michael Sean Bates, North Oaks; Donna C. Rockette, Maplewood, both of MN (US); David C. Roeker, Hudson, WI (US); David F. Slama, Vadnais Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/357,596

(22) Filed: Jul. 20, 1999

(51) Int. Cl.[7] .................................................. A61B 17/06
(52) U.S. Cl. ............................................... 206/449
(58) Field of Search .................... 206/449, 497; 211/49.1, 50, 57.1

(56) References Cited

U.S. PATENT DOCUMENTS

| | | |
|---|---|---|
| D. 238,543 * | 1/1976 | Lechmer . |
| 563,562 | 7/1896 | Burns . |
| 1,211,269 | 1/1917 | Abbott . |
| 1,379,299 | 5/1921 | Grizzel . |
| 1,379,379 | 5/1921 | Abrahmsen . |
| 2,965,016 * | 12/1960 | Price . |
| 4,298,126 * | 11/1981 | Filipowicz . |
| 4,911,308 | 3/1990 | Nylund . |
| 4,971,207 * | 11/1990 | Baucom . |
| 5,033,628 * | 7/1991 | Scholes . |
| 5,050,738 * | 9/1991 | McAdams ........................ 206/497 |
| 5,330,060 | 7/1994 | Bohner . |
| 5,701,999 * | 12/1997 | Phillips, II et al. .............. 206/497 |

FOREIGN PATENT DOCUMENTS

| | | |
|---|---|---|
| 340 443 | 9/1959 | (CH) . |
| 74 05 831 U | 5/1974 | (DE) . |
| 74 39 832 U | 5/1975 | (DE) . |
| 1 455 364 | 11/1976 | (GB) . |
| 2 108 080 | 5/1983 | (GB) . |

\* cited by examiner

*Primary Examiner*—David T. Fidei
(74) *Attorney, Agent, or Firm*—William L. Huebsch

(57) ABSTRACT

A container for a stack of sheets (e.g., abrasive coated discs) including a base portion adapted to extend transversely across a bottom surface of the stack of sheets and having opposite ends adapted to be positioned at spaced locations along a side surface of the stack of sheets; and a plurality of stiff elongate retaining portions having proximal portions attached to the base portion at its opposite ends with the retaining portions at spaced locations around the side surface of the stack of sheets. The retaining portions have central parts adapted to extend along the side surface of the stack of sheets from its bottom surface to its top surface at those spaced locations, and have distal parts adapted to extend above the top surface of the stack of sheets. Those retaining portions are positioned or bendable to position the distal part in contact with the top surface of the stack of sheets, and have a shape or retain a shape to which the retaining portions are bent to retain the stack of sheets in the container.

17 Claims, 4 Drawing Sheets

CONTAINER FOR STACKED SHEETS

FIELD OF THE INVENTION

The present invention relates to containers for stacks of sheets (e.g., stacks of rectangular or round abrasive covered sheets) in which containers the stack of sheets may be shipped from the manufacturer of the sheets to the consumer, and from which containers that consumer may dispense or withdraw the sheets as they are used.

BACKGROUND OF THE INVENTION

Many forms of containers have been used for shipping stacks of sheets (e.g., stacks of rectangular or round abrasive covered sheets) from the manufacturer of the sheets to the consumer. Paper or plastic envelopes have been used, as have cardboard boxes. In some instances, the consumer retains the stack of sheets in the container as they are dispensed or withdrawn for use, whereas in other instances the stack of sheets is transferred from the shipping container to a separate dispenser before the sheets are dispensed or withdrawn for use.

As an example, using cardboard boxes to ship stacks of abrasive covered sheets or disks to consumers requires the use of a large number of different boxes to accommodate the different grades of abrasives and diameters of disks that may be sold. Disks of different diameters require boxes of different widths. Also, stacks of the same number of disks with different grades of abrasive adhered to them can have significantly different heights, and therefore require boxes of different heights. Additionally, the boxes are typically printed with different nomenclature to indicate the type and size of abrasive they contain. The need to prepare and inventory so many different boxes adds significant cost for the manufacturer, and the consumer must dispose of the boxes after the sheets are removed. Dispensing or withdrawing abrasive disks from such boxes may not be as convenient as is sometimes desired, so that special dispensers are sometimes supplied by the manufacturer for use by the consumer at little or no cost to the consumer, but at significant cost to the manufacturer.

DISCLOSURE OF THE INVENTION

The present invention provides inexpensive containers for stacks of sheets in which the stack of sheets may be shipped from the manufacturer of the sheets to the consumer, and from which that consumer may conveniently dispense or withdraw the sheets as they are used. Containers according to the present invention can be easily adapted in size by the manufacturer to accommodate stacks of different size and heights, and afford relatively easy dispensing or withdrawing of sheets by the consumer.

According to the present invention there is provided a container for a stack of sheets (e.g., abrasive coated discs), which container comprises a base portion adapted to extend transversely across a bottom surface of the stack of sheets and having opposite ends adapted to be positioned at spaced locations along a side surface of the stack of sheets; and a plurality of stiff elongate retaining portions having proximal portions attached to the base portion at its opposite ends with the retaining portions at spaced locations around the side surface of the stack of sheets. The retaining portions have central parts adapted to extend along the side surface of the stack of sheets from its bottom surface to its top surface at those spaced locations, and have distal parts adapted to extend above the top surface of the stack of sheets. Those retaining portions are bendable to position the distal part in contact with the top surface of the stack of sheets, and the retaining portions will retain the shape to which they are bent sufficiently to retain the stack of sheets in the container.

The base and retaining portions of the container can be formed of metal wire, with the base portion being formed from first and second lengths of that wire, with each of the lengths of wire being adapted to extend across the bottom surface of the stack of sheets and having opposite ends adapted to be positioned at the spaced locations along the side surface of the stack of sheets; and the retaining portions comprising two generally U-shaped lengths of the wire having opposite ends attached to the first and second lengths of metal wire at the spaced locations. Such containers can be custom formed by wire forming equipment at a packaging location to accommodate stacks of sheets of different widths and heights. A sheet bearing information concerning the sheets can be added to the stack, and the stack including the informational sheet can be wrapped in a transparent polymeric material to complete the packaging.

Optionally, a coating or layer of scratch resistant material (e.g., a polymeric or rubber material) can be placed on the base portion to provide scratch resistant feet for the package, and/or a support bracket can be provided with the container by which its base portion can be supported along a vertical or horizontal surface.

As an alternative to wire, the base and retaining portions of the container can be portions of a unitary metal stamping, the base portion can be generally rectangular and can have corners adapted to be positioned at the spaced locations along the side surface of the stack of sheets, and the retaining portions can project from the base portion at its corners.

Also, the container can be formed of polymeric material (e.g., by injection molding), in which case the retaining portions can be bent by applying heat.

A container for a stack of sheets can also be provided that has such a base portion adapted to extend transversely across a bottom surface of the stack of sheets and opposite ends adapted to be positioned at spaced locations along a side surface of the stack of sheets; and a plurality of stiff elongate retaining portions having proximal portions attached to the base portion at its opposite ends with the retaining portions at spaced locations around the side surface of the stack of sheets, which retaining portions have central parts adapted to extend along the side surface of the stack of sheets from its bottom surface to its top surface at those spaced locations, and have distal parts generally in the shape of hooks with surfaces positioned to engage the top surface of the stack of sheets to retain the stack of sheets in the container.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
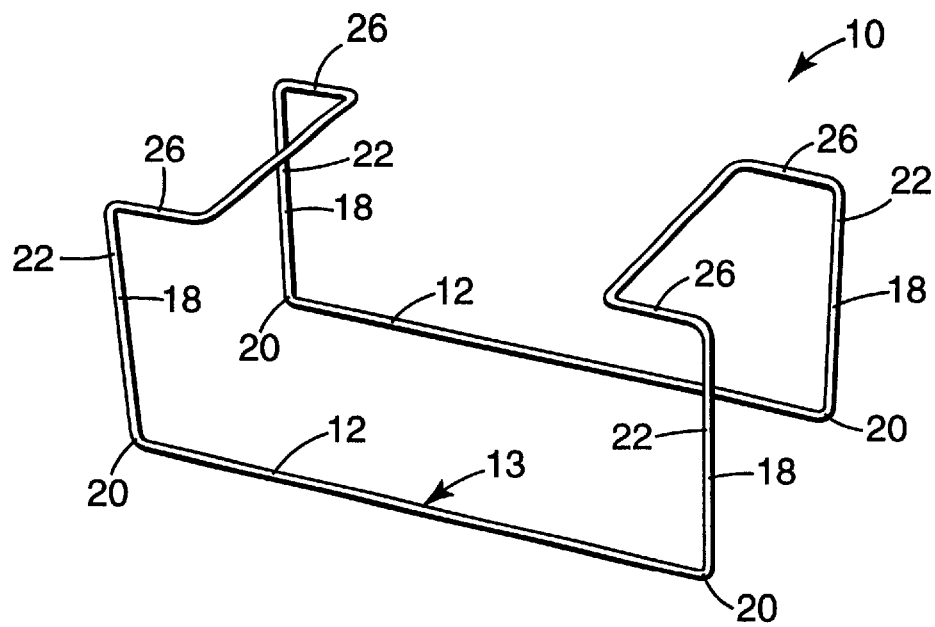
FIG. 1 is a perspective view of a first embodiment of a container according to the present invention with retaining portions of the container bent as they would be to retain a stack of sheets in the container.
Figure 2:
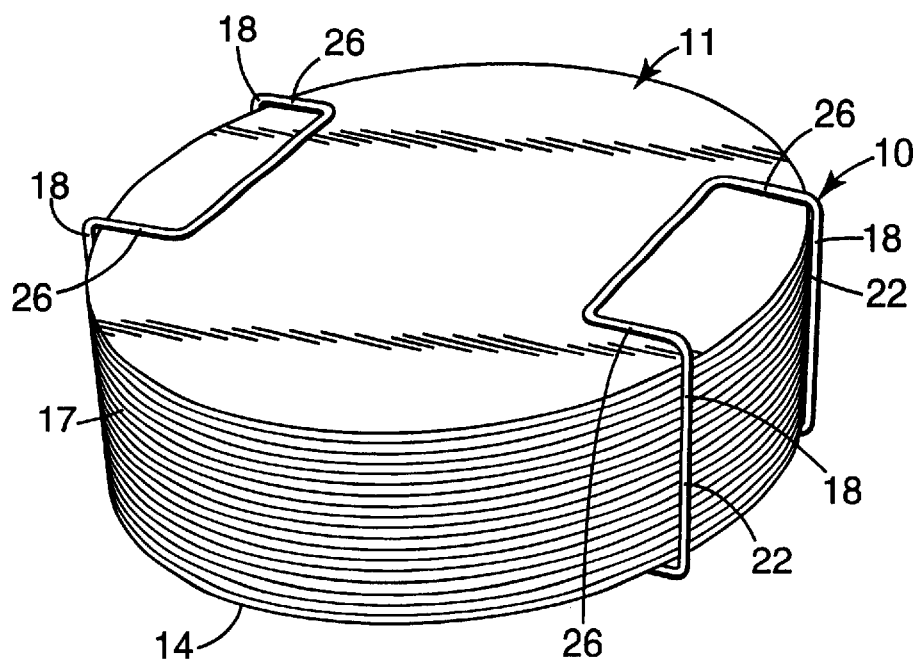
FIG. 2 is a perspective view of the container of FIG. 1 containing a stack of sheets.

Referring now to FIGS. 1 and 2 of the drawing, there is illustrated a first embodiment of a container for a stack 11 of round sheets or discs, which container is generally designated by the reference numeral 10.

The container 10 is formed of wire (e.g., 16 or 18 gauge copper plated, corrosion resistant wire of the type used in wire fed electrical welders) and includes two parallel spaced portions 12 of the wire forming a base portion 13 of the container 10, which portions 12 are adapted to extend transversely across a bottom surface 14 of the stack 11 of sheets. The base portion 13 has opposite ends defined by the wire portions 12 that are adapted to be positioned at spaced locations along a side surface 17 of the stack 11 of sheets. The container 10 also includes a plurality of stiff elongate retaining portions 18 defined by generally U-shaped portions of the wire that have proximal ends 20 attached to the base portion 13 at its opposite ends with the retaining portions 18 at spaced locations around the side surface 17 of the stack 11 of sheets. The retaining portions 18 have central parts 22 adapted to extend along the side surface 17 of the stack 11 of sheets from its bottom surface to its top surface at those spaced locations, and have distal parts 26 adapted to extend above the top surface of the stack 11 of sheets. The wire forming the retaining portions 18 is bendable by the application of a significant force (i.e., either by a machine or manually) to position the distal parts 26 in contact with the top surface of the stack 11 of sheets and, after being bent, retains a shape to which the retaining portions 18 are bent (i.e., retains its shape until a significant force is again applied to bend it) sufficiently to retain the stack 11 of sheets in the container 10 as is illustrated in FIG. 2.

Figure 3:
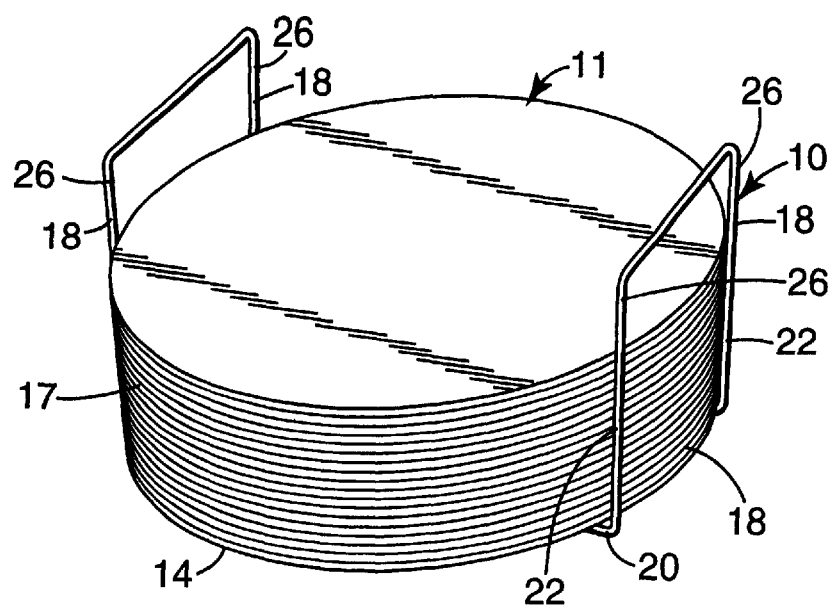
FIG. 3 is a perspective view of the container of FIG. 2 with the stack of sheets positioned in the container before the retaining portions are bent to retain the stack of sheets in the container.

The container 10 can be custom formed by wire forming equipment at a packaging location to accommodate stacks of sheets of different widths and heights in the form illustrated in FIG. 3 with its retaining portions 18 projecting upwardly at right angles to its base portion 13. The stack 11 of sheets (including if desired, a sheet forming the top or bottom surface of the stack 11 bearing information concerning the sheets) can be placed in the container 10 and pressed together against the base portion 13. The retaining portions 18 can be bent by the wire forming equipment or otherwise to place their distal parts 26 in contact with the top surface of the stack 11 as illustrated in FIG. 2. If desired, the stack 11 and container 10 around it can then be wrapped in a transparent polymeric material (not illustrated).

Figure 4:
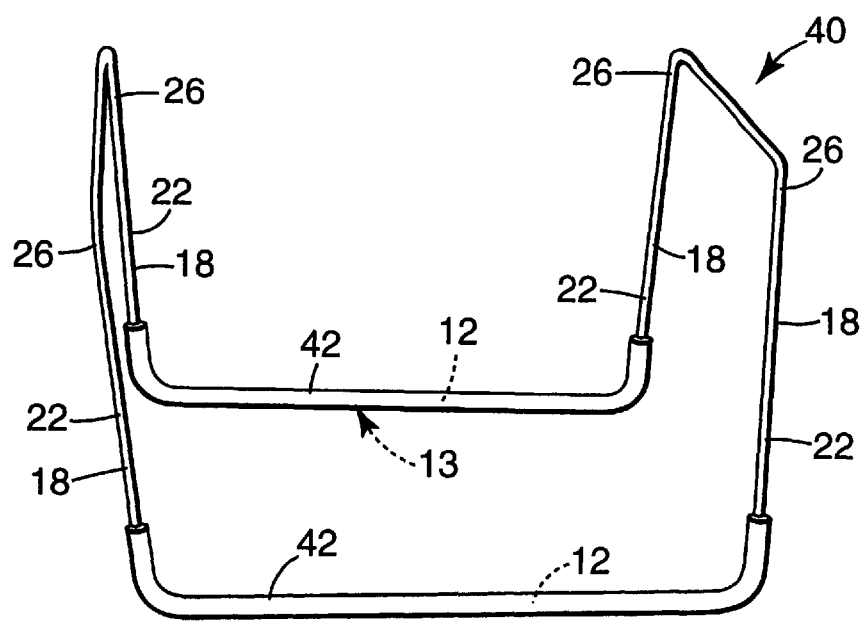
FIG. 4 is a perspective view of a second embodiment of a container according to the present invention in which retaining portions of the container are not bent.

FIG. 4 illustrates a second embodiment of a container 40 according to the present invention that includes all of the portions of the container 10 described above which bear the same numerical references, together with layers 42 (e.g., coatings or tubes) of scratch resistant polymeric or rubber material (e.g., vinyl or Teflon) on or around the portions 12 of the wire forming the base portion 13 to provide a scratch resistant bottom surface for the container 40. If a coating is used, it might be applied only, or predominantly, in a layer along the side of the potions 12 of the wire forming the base portion 13 that are to be opposite the stack 11 of sheets.

Figure 5:
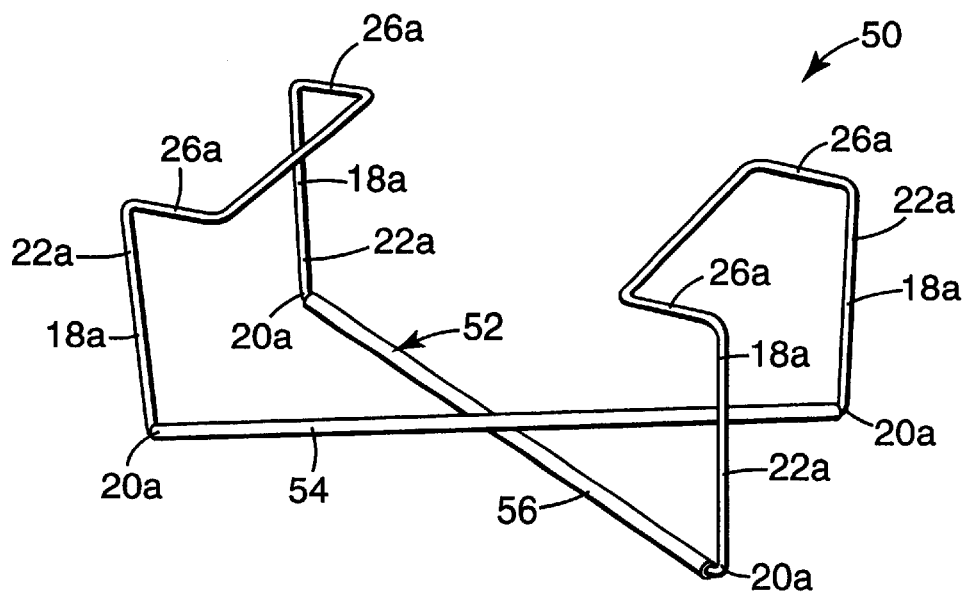
FIG. 5 is a perspective view of a third embodiment of a container according to the present invention with retaining portions of the container bent as they would be to retain a stack of sheets in the container.

FIG. 5 illustrates a third embodiment of a container 50 according to the present invention which has almost all of the same portions described above with reference to the container 10 (those same portions bearing the same numerical references to which have been added the suffix "a"). The container 50 only differs from the container 10 in that its base portion 52 is formed by first and second straight portions 54 and 56 of the wire that form the base portion, instead of being parallel, extend across each other to form an X-shaped base portion, and are attached by welding to each other where they cross.

Figure 6:
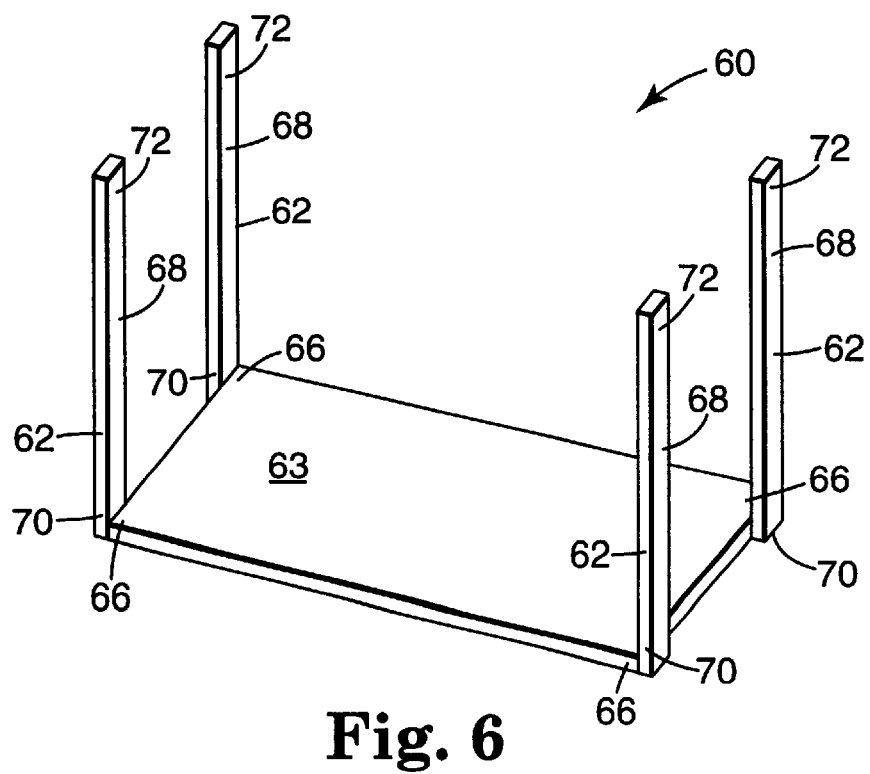
FIG. 6 is a perspective view of a fourth embodiment of a container according to the present invention in which retaining portions of the container are not bent.

FIG. 6 of the drawing illustrates a fourth embodiment of a container for a stack of sheets generally designated by the reference numeral 60. The container 60 is a sheet metal stamping (e.g., 16 or 18 gauge steel having thicknesses of 0.0598 inch (0.15 cm) or 0.0478 inch (1.2 cm), respectively) and includes a rectangular base portion 63 adapted to extend transversely across a bottom surface of the stack of sheets, which base portion 63 has corners 66 at opposite ends that are adapted to be positioned at spaced locations along a side surface of the stack of sheets. The container 60 also includes a plurality of or four stiff elongate retaining portions 68 that have proximal ends 70 attached to the base portion 63 at its corners 66 with the retaining portions 68 at spaced locations around the side surface of the stack of sheets, having central parts 62 adapted to extend along the side surface of the stack of sheets from its bottom surface to a top surface of the stack of sheets at those spaced locations, and having distal parts 72 adapted to extend above the top surface of the stack of sheets. The retaining portions 68 are bendable (e.g., by a machine or manually) to position the distal parts 72 in contact with the top surface of the stack of sheets and, after being bent, retain a shape to which the retaining portions 68 are bent sufficiently (i.e., retains its shape until again bent with significant force) to retain the stack of sheets in the container 60. The container 60 could have a layer (not illustrated) of scratch resistant polymeric or rubber material on the outer surface of the base portion 63 to provide a scratch resistant bottom surface for the container 60.

Figure 7:
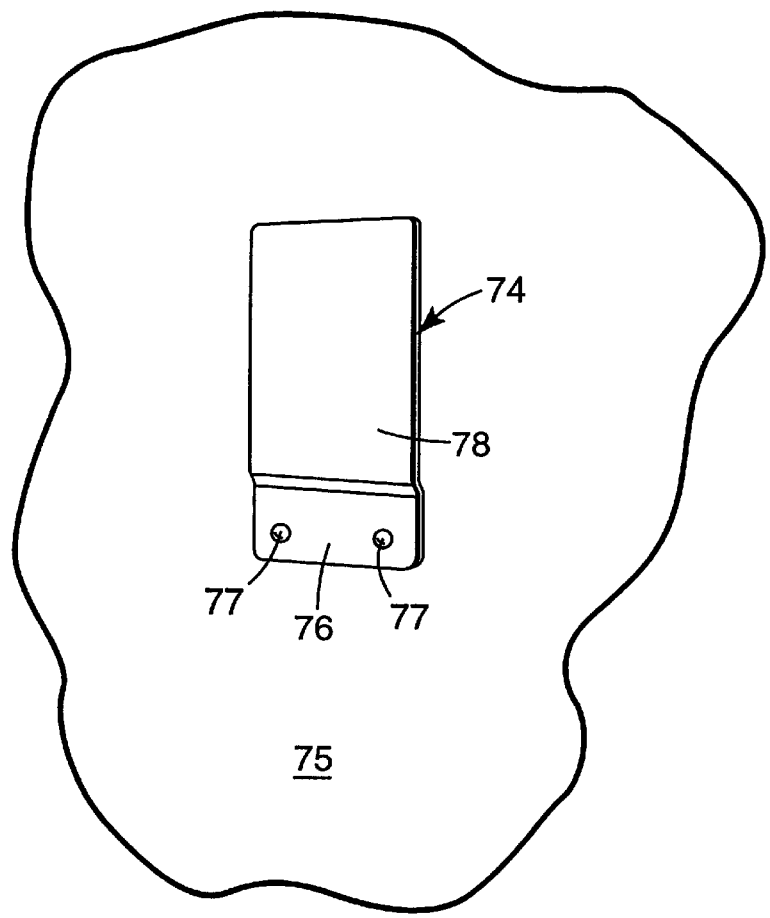
FIG. 7 is a perspective view of a support bracket mounted on a surface by which the base portions of the containers can be supported along that surface.

FIG. 7 illustrates a generally rectangular support bracket 74 mounted on a surface 75 (e.g., vertical or horizontal surface 75) by which the base portions of the containers 10, 40, 50, and 60 described above can be supported and retained along that vertical surface 75 to facilitate removing sheets from the containers. The bracket 74 has a lower portion 76 attached along the surface 75 by fasteners 77, and is bent to space an upper portion 78 of the bracket 74 away from the surface so that the base portion of one of the containers 10, 40, 50, or 60 can be positioned and retained between that upper portion 78 and the surface 75.

Figure 8:
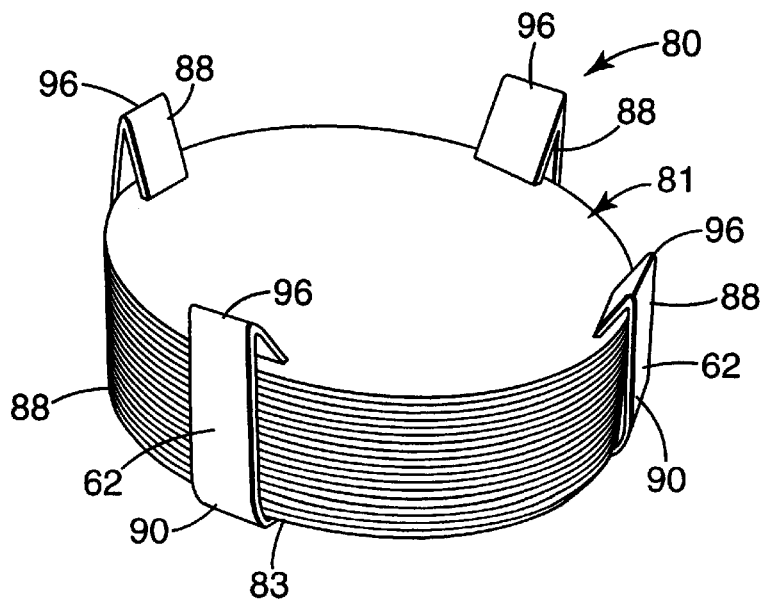
FIG. 8 is a perspective view of a fifth embodiment of a container according to the present invention containing a stack of sheets and with retaining portions of the container bent or positioned to retain the stack of sheets in the container.

FIG. 8 illustrates a fifth embodiment of a container 80 according to the present invention for a stack 81 of sheets, which container 80 could be stamped from metal (e.g., steel) or molded of a polymeric material (e.g., polypropylene). The container 80 includes a circular base portion 83 adapted to extend transversely across a bottom surface of the stack 81 of sheets, which base portion 83 has a periphery adapted to be positioned along a side surface of the stack 81 of sheets. The container 80 also includes a plurality of or four stiff elongate retaining portions 88 that have proximal ends 90 attached to the base portion 83 at equally spaced positions around its periphery to position the retaining portions 88 at spaced locations around the side surface of the stack 81 of sheets. The retaining portions 88 have central parts 62 adapted to extend along the side surface of the stack of 81 sheets from its bottom surface to a top surface of the stack 81 of sheets at those spaced locations, and having distal parts 96 adapted to extend above the top surface of the stack 81 of sheets. The retaining portions 88 are manually bendable (i.e., with the application of heat when make of polymeric material) to position the distal parts 96 in contact with the top surface of the stack 81 of sheets and, after being bent and, if necessary, cooled, retain a shape to which the retaining portions 88 are bent sufficiently (i.e., retains its shape until again heated and manually bent) to retain the stack 81 of sheets in the container 80.

Alternatively, when the height of the stack 81 of sheets to be packaged is known, the retaining portions 88 of the container 80 could be bent or molded to have distal parts 96 in the shape illustrated in FIG. 8 before the stack 81 of sheets is placed in the container 80. The stack 81 of sheets could then be placed in the container 80 by pressing it downwardly between the retaining portions 88, whereupon the uppermost surfaces 98 of the distal parts 96, which are disposed at an acute angle (e.g., preferably less than 45 degrees) with respect to the side surface of the stack 81 of sheets, will act as cams to resiliently deflect the retaining portions 88 outwardly until the stack 81 of sheets is positioned beneath the distal parts 96. The distal parts 96 will then move along the top surface of the stack 81 of sheets to retain it in the container 80. If the retaining portions 88 of the container 88 are so molded, the distal parts 96 could be molded to have solid triangular cross sections.

The present invention has now been described with reference to several embodiments and possible modifications thereof It will be apparent to those skilled in the art that many changes can be made in the embodiments described without departing from the scope of the present invention. For example, any of the containers could have a layer of scratch resistant polymeric or rubber material on the outer surface of their base portion to provide a scratch resistant bottom surface for the container. While the containers illustrated and described above each have four retaining portions, they, alternatively, could have less (e.g., three) or more (e.g., 5 or 6) retaining portions. Also, while the illustrated containers are described as being made from metal or polymeric materials, materials such as fibrous materials (e.g., cardboard) or wood (e.g., bamboo) could also be used in whole or in part to form containers of the type described. Thus, the scope of the present invention should not be limited to the structures described in this application, but only by the structures described by the language of the claims and the equivalents thereof.

What is claimed is:

1. In combination,
    a stack of sheets having a bottom surface defined by a bottom sheet in the stack, a side surface defined by edges of sheets in the stack, and a top surface defined by an uppermost sheet in the stack; and
    a container comprising:
        a base portion extending transversely across the bottom surface of the stack of sheets, said base portion having opposite ends positioned at spaced locations along the side surface of the stack of sheets; and a plurality of stiff elongate retaining portions having proximal ends attached to said base portion at said opposite ends with said retaining portions at spaced locations around the side surface of the stack of sheets, having central parts extending along the side surface of the stack of sheets from the bottom surface to the top surface of the stack of sheets at said spaced locations, and having distal parts extending above the top surface of the stack of sheets, said retaining portions being non-resiliently bent to position said distal parts in contact with the top surface of the stack of sheets and said retaining portions retaining a shape to which said retaining portions are bent to retain the stack of sheets in the container.

2. A combination according to claim 1 wherein said base portion and said retaining portions are formed of metal wire, said base portion being formed from first and second lengths of said wire, each of said lengths of wire extending transversely across the bottom surface of the stack of sheets and having opposite ends positioned at said spaced locations along the side surface of the stack of sheets; and said retaining portions comprising two generally U-shaped lengths of metal wire having opposite ends attached to said first and second lengths of metal wire at said spaced locations.

3. A combination according to claim 2 wherein said first and second lengths of wire forming said base portion are straight and are in parallel spaced relationship.

4. A combination according to claim 2 wherein said first and second lengths of wire forming said base portion are straight and extend cross each other to form an X-shaped base portion, said first and second lengths of wire being attached to each other where they cross.

5. A combination according to claim 1 further including a layer of scratch resistant polymeric material on said base portion.

6. A combination according to claim 1 wherein said base portion and said retaining portions are portions of a unitary stamping of sheet metal, said base portion being generally rectangular and having corners positioned at said spaced locations along the side surface of the stack of sheets; and said retaining portions projecting from said base portion at said corners.

7. A combination according to claim 1 wherein said container is formed of non-resiliently bendable metal.

8. A combination according to claim 1 wherein said container is formed of polymeric material that is bendable upon the application of heat.

9. A combination according to claim 1 further including an outer wrap of flexible transparent polymeric material around said container and stack of sheets.

10. A container for a stack of sheets having a bottom surface defined by a bottom sheet in the stack, a side surface defined by edges of sheets in the stack, and a top surface defined by an uppermost sheet in the stack, said container comprising:
    a base portion adapted to extend transversely across the bottom surface of the stack of sheets, said base portion having opposite ends adapted to be positioned at spaced locations along the side surface of the stack of sheets; and
    a plurality of stiff elongate retaining portions having proximal ends attached to said base portion at said opposite ends with said retaining portions at spaced locations around the side surface of the stack of sheets, having central parts adapted to extend along the side surface of the stack of sheets from the bottom surface to the top surface of the stack of sheets at said spaced locations, and having distal parts adapted to extend above the top surface of the stack of sheets, said retaining portions being non-resiliently bendable to position said distal parts in contact with the top surface of the stack of sheets and retaining a shape to which said retaining portions are bent to retain the stack of sheets in the container.

11. A container according to claim 10 wherein said base portion and said retaining portions are formed of metal wire, said base portion being formed from first and second lengths of said wire, each of said lengths of wire being adapted to extend transversely across the bottom surface of the stack of sheets and having opposite ends adapted to be positioned at said spaced locations along the side surface of the stack of sheets; and said retaining portions comprising two generally U-shaped lengths of metal wire having opposite ends attached to said first and second lengths of metal wire at said spaced locations.

12. A container according to claim 11 wherein said first and second lengths of wire forming said base portion are straight and are in parallel spaced relationship.

13. A container according to claim 11 wherein said first and second lengths of wire forming said base portion are straight and extend cross each other to form an X-shaped base portion, said first and second lengths of wire being attached to each other where they cross.

14. A container according to claim 10 further including a layer of scratch resistant polymeric material on said base portion.

15. A container according to claim 10 wherein said base portion and said retaining portions are portions of a unitary stamping of sheet metal, said base portion being generally rectangular and having corners adapted to be positioned at said spaced locations along the side surface of the stack of sheets; and said retaining portions projecting from said base portion at said corners.

16. A container according to claim 10 formed of bendable metal.

17. A container according to claim 10 formed of polymeric material that is bendable upon the application of heat.

* * * * *